United States Patent
Beltrami (10) Patent No.: US 9,580,232 B1
(45) Date of Patent: Feb. 28, 2017

(54) FOOD DISPENSING CADDY

(71) Applicant: Michael S. Beltrami, Kingston (CA)

(72) Inventor: Michael S. Beltrami, Kingston (CA)

( * ) Notice: Subject to any disclaimer, the term of this patent is extended or adjusted under 35 U.S.C. 154(b) by 0 days.

(21) Appl. No.: 15/098,432

(22) Filed: Apr. 14, 2016

Related U.S. Application Data (60) Provisional application No. 62/147,143, filed on Apr. 14, 2015.

(51) Int. Cl.
| | |
|---|---|
| *B65D 75/00* | (2006.01) |
| *B65D 83/08* | (2006.01) |
| *B65D 25/04* | (2006.01) |
| *B65D 85/76* | (2006.01) |
| *A47J 47/01* | (2006.01) |
| *B65D 43/02* | (2006.01) |
| *B65D 25/22* | (2006.01) |

(52) U.S. Cl.
CPC .......... *B65D 83/0805* (2013.01); *A47J 47/01* (2013.01); *B65D 25/04* (2013.01); *B65D 25/22* (2013.01); *B65D 43/02* (2013.01); *B65D 85/76* (2013.01)

(58) Field of Classification Search
CPC combination set(s) only.
See application file for complete search history.

(56) References Cited

U.S. PATENT DOCUMENTS

| | | | |
|---|---|---|---|
| 1,595,097 A | | 8/1926 | Howell |
| 2,102,859 A | | 12/1937 | Spousta |
| 2,447,096 A | * | 8/1948 | Schneider ............... B65D 75/68 |
| | | | 206/216 |
| 4,004,691 A | * | 1/1977 | Wihksne .............. B65D 5/4229 |
| | | | 206/459.1 |
| 4,960,024 A | | 10/1990 | Holcomb |
| 5,152,590 A | * | 10/1992 | Dukes ....................... A47F 1/06 |
| | | | 312/306 |
| 5,621,972 A | | 4/1997 | Sala |
| 5,819,927 A | * | 10/1998 | Yeh ..................... G11B 33/0438 |
| | | | 206/308.1 |
| 6,158,585 A | * | 12/2000 | Labat ................. B65D 83/0805 |
| | | | 206/372 |
| 6,722,526 B1 | * | 4/2004 | Passetti ..................... A47F 1/08 |
| | | | 221/155 |
| 6,938,896 B2 | | 9/2005 | Tsuchida |
| 8,348,278 B2 | | 1/2013 | Tseng |
| 2006/0027639 A1 | * | 2/2006 | Rasmussen ............... A47F 1/08 |
| | | | 229/122.1 |
| 2008/0111300 A1 | | 5/2008 | Czyzewski et al. |
| 2015/0292792 A1 | * | 10/2015 | Shrader .................. F25D 23/02 |
| | | | 312/405.1 |

OTHER PUBLICATIONS

Joie Moo-Moo Cow Cheese Slice Holder Pod. Product Listing [online]. MSC International, 2012 [retrieved on Feb. 3, 2015]. Retrieved from the Internet: http://www.amazon.com/Joie-Moo-Moo-Cheese-Slice-Holder/dp/B0071010GK.

* cited by examiner

*Primary Examiner* — Jacob K Ackun
(74) *Attorney, Agent, or Firm* — Robert C. Montgomery; Montgomery Patent & Design LP.

(57) ABSTRACT

A food dispensing caddy is capable of being removably mounted to a support structure, such as a refrigerator. The caddy is a five-sided structure with an open top. The structure is divided into compartments, each of which can be covered with a lid. Each compartment is capable of being stacked with items therein for subsequent dispensation through an opening in the front. Such a caddy is useful for dispensing individually-wrapped food items.

19 Claims, 6 Drawing Sheets

Fig. 6

FOOD DISPENSING CADDY

RELATED APPLICATIONS

The present invention is a continuation-in-part of, was first described in, and claims the benefit of U.S. Provisional Application No. 62/147,143, filed Apr. 14, 2015, the entire disclosures of which are incorporated herein by reference.

FIELD OF THE INVENTION

The present invention relates generally to the field of dispensing receptacles and more specifically relates to dispensing receptacles for organizing and dispensing food items.

BACKGROUND OF THE INVENTION

Everyday people consume cheese. Unfortunately, there is not an accessible way to organize and dispense cheese without spending extra time looking for and organizing the type of cheese in a fashion that makes it easily available. There are compartments available for eggs and butter; however, none exist for organizing and displaying cheese.

Cheeses are a widely enjoyed food item which is often eaten with various crackers, breads and spreads. The cheeses, which can be rectangular, round, oblong, or other such shape, are typically packaged together in a stacked configuration and heat sealed within a thin plastic wrapper to form individually wrapped slices.

Various attempts have been made to solve problems found in comestible dispensing art. Among these are found in: U.S. Pat. No. 3,287,073 to Gynt Holtkamp Peer; U.S. Pat. No. 6,722,526 to Valentino Passetti; and U.S. Pat. No. 4,144,662 to Halbert H. Drexler. These prior art references are representative of various types of food dispensers.

None of the above inventions and patents, taken either singly or in combination, is seen to describe the invention as claimed. Thus, a need exists for a reliable food dispensing system, and to avoid the above-mentioned problems.

SUMMARY OF THE INVENTION

It is therefore an object of the present invention to provide such a dispensing caddy that is capable of being mounted to a support structure, such as a refrigerator. The caddy preferably has a pair of compartments capable of accepting a stack of individually-wrapped cheese slices. In certain embodiments, the caddy is a unitary five-side structure with a pair of side panels, a front panel, a rear panel, and a bottom panel. The pair of side panels extend downward to act as feet for supporting the caddy. The front panel has a pair of openings, each providing front access to a compartment. The bottom panel is sloped from the rear panel to the front panel, thereby biasing the bottommost item within each compartment towards a respective opening. A divider panel separates the pair of compartments, each of which has an open top removably covered by a lid.

Another object of the present invention is to provide a continuous bottom portion for the pair of openings, coextensive with a width of the front panel.

Another object of the present invention is to provide a view slot having a bottom portion extending upward from the continuous bottom portion of each opening, terminating in a half-moon shape. Each view slot is centrally located on a given compartment.

Another object of the invention is to provide a foot centrally located on the divider panel, coterminous with the bottom edge of each of the side panels to provide additional stability.

Another object of the present invention is to provide a stiffener rib affixed to the bottom panel and disposed perpendicularly from the foot.

Yet another object of the present invention is to provide a such a front panel having a bulbous bottom extending forwardly to provide clearance for the bottommost items in each compartment, due to the biasing of them towards the front panel due to the sloping bottom panel.

Still yet another object of the invention is to provide a mounting bracket capable of being attached to the support structure, the mounting bracket being correspondingly and removingly mated with an appendage of the rear panel.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 food dispensing caddy
15a first compartment
15b second compartment
16a first lid
16b second lid
18 stiffener rib
20 front panel
21 first side panel
22 second side panel
23 foot
24 bottom panel
25 rear panel
27 divider panel 30a first opening
30b second opening
31a first view slot
31b second view slot
50 mounting bracket
51 appendage
100 foodstuff
150 refrigerator

DETAILED DESCRIPTION OF THE PREFERRED EMBODIMENT

Figure 1:
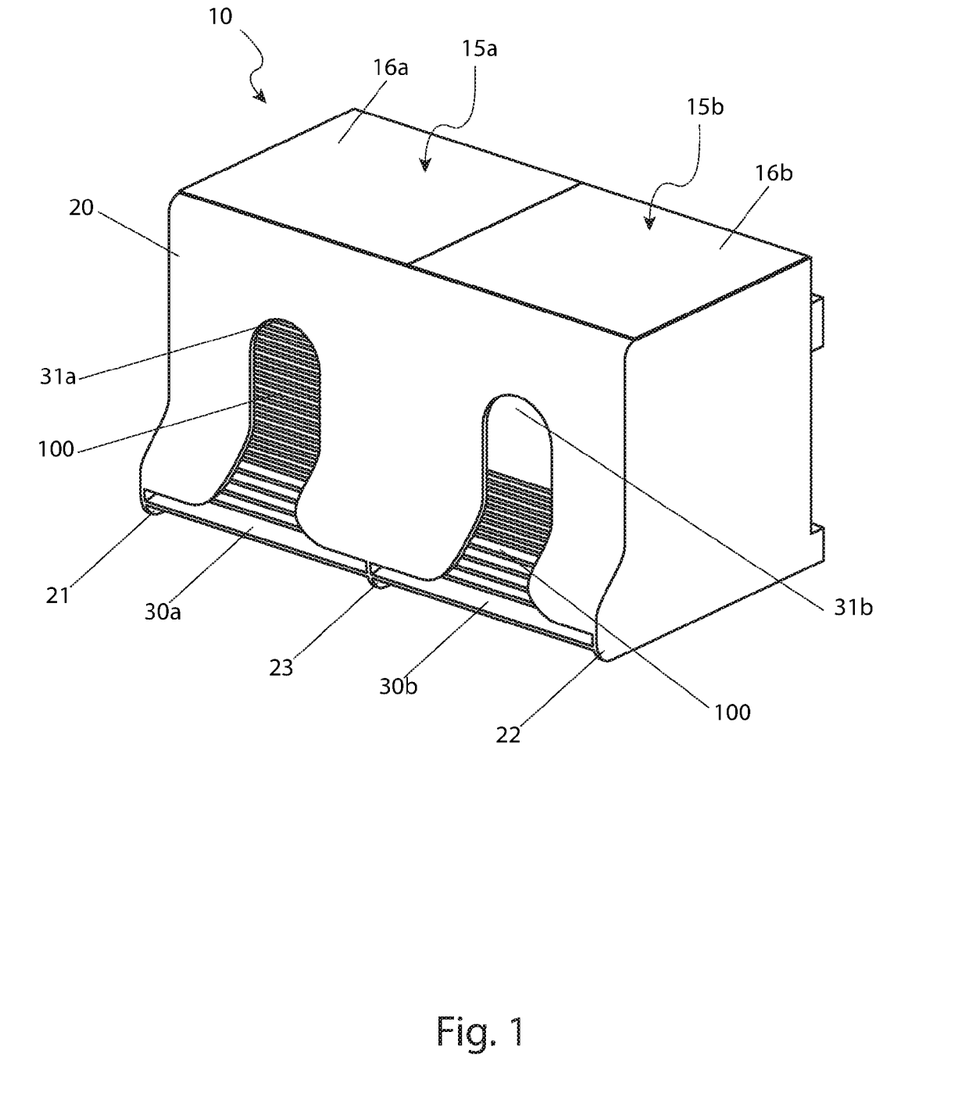
FIG. 1 is a perspective view of a food dispensing caddy 10 during an "in-use" condition showing the orientation of foodstuff 100 within the provided receptacle 15a, 15b according to an embodiment of the present invention.
Figure 2A:
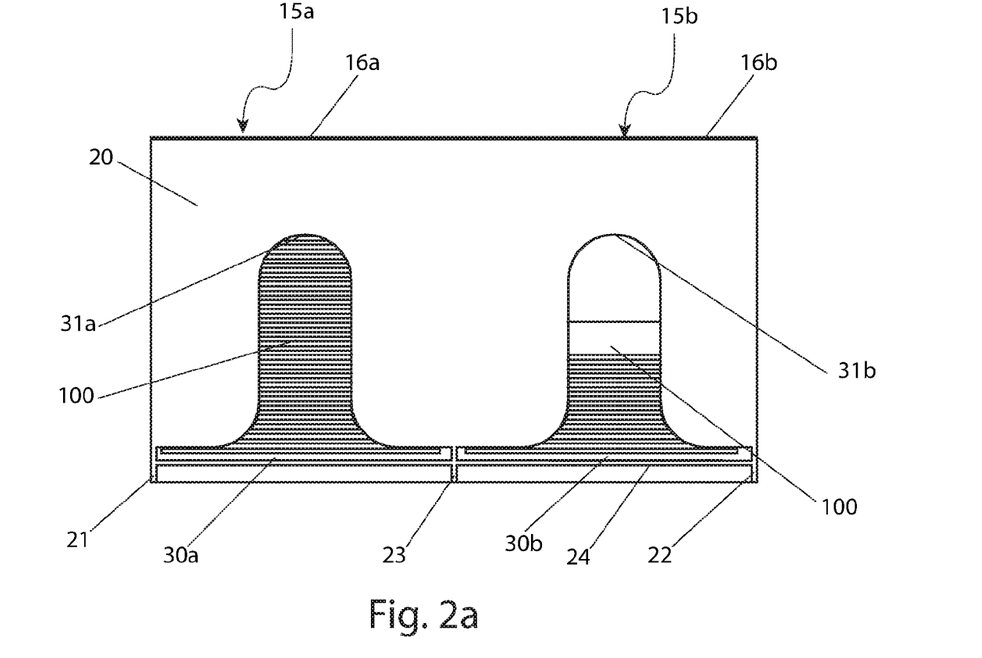
FIG. 2a is a front view illustrating the food dispensing caddy 10 according to the preferred embodiment of the present invention.
Figure 2B:
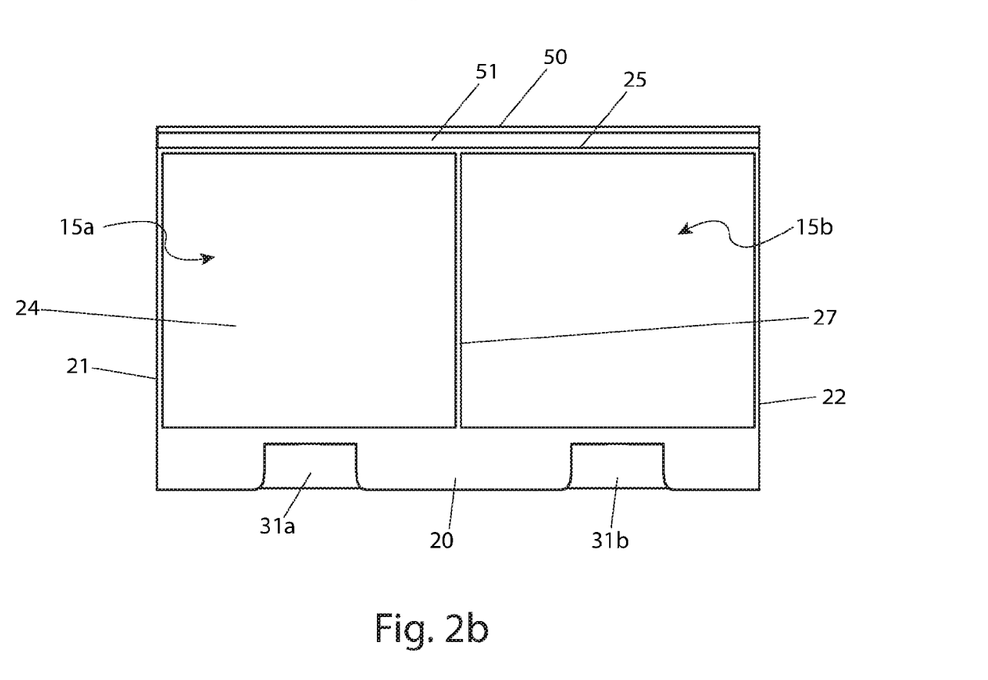
FIG. 2b is a top view illustrating the food dispensing caddy 10 according to the preferred embodiment of the present invention.
Figure 3A:
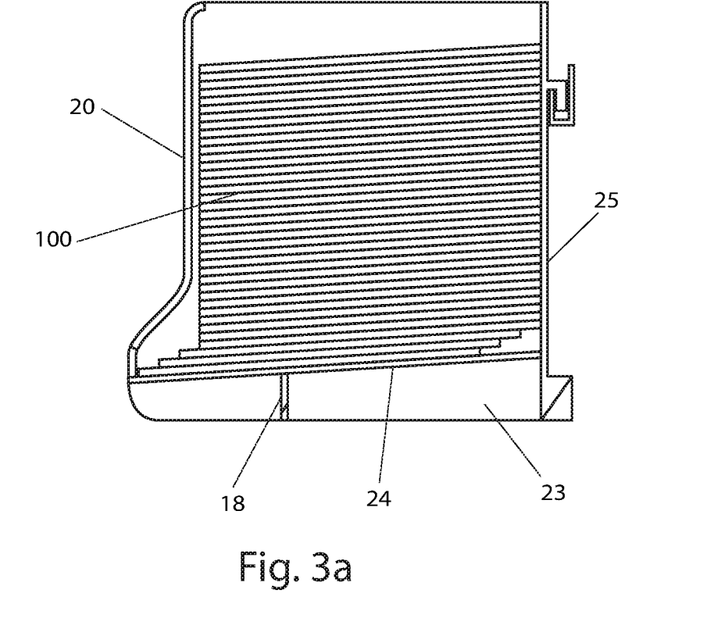
FIG. 3a is a cut-away side view illustrating the food dispensing caddy 10 according to the preferred embodiment of the present invention.
Figure 3B:
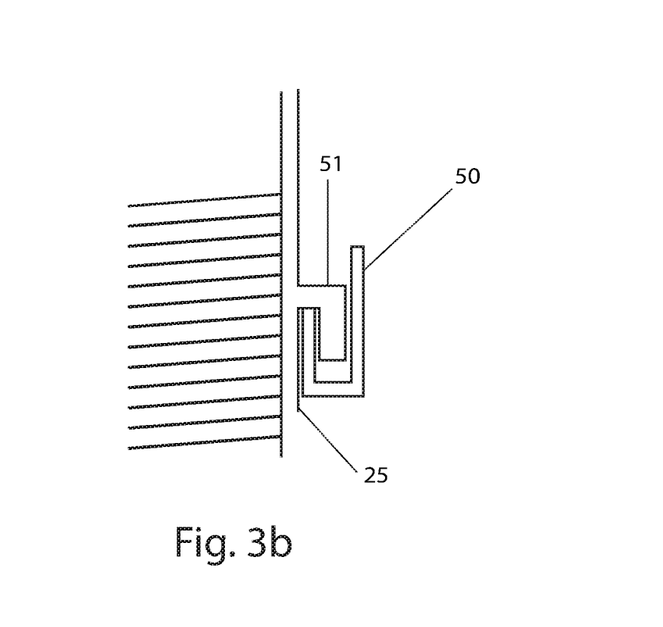
FIG. 3b is a side cut-away view showing a close up of the mounting bracket 50 and appendage 51 according to the preferred embodiment of the present invention.
Figure 4:
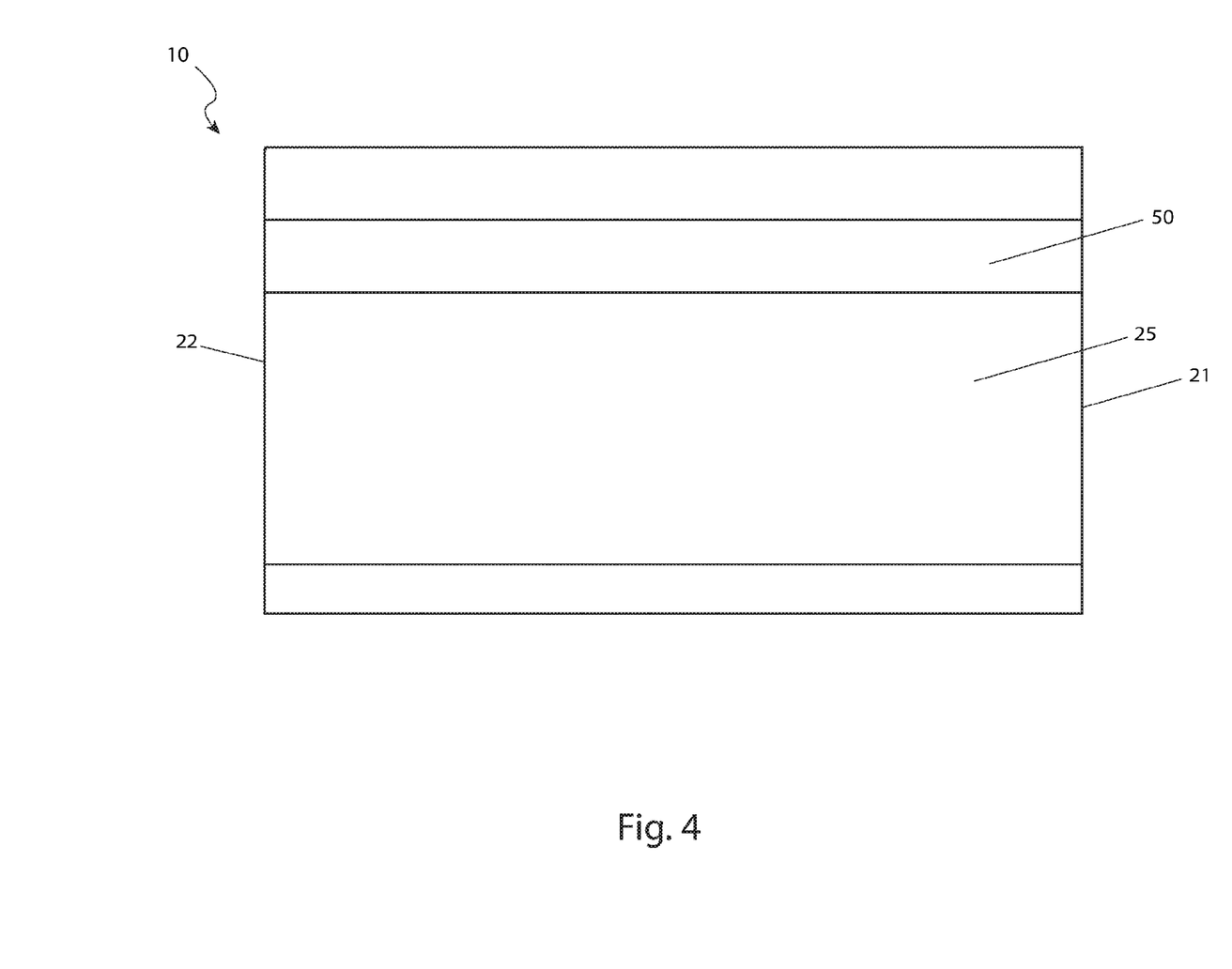
FIG. 4 is a rear view illustrating the food dispensing caddy 10 according to the preferred embodiment of the present invention.
Figure 5A:
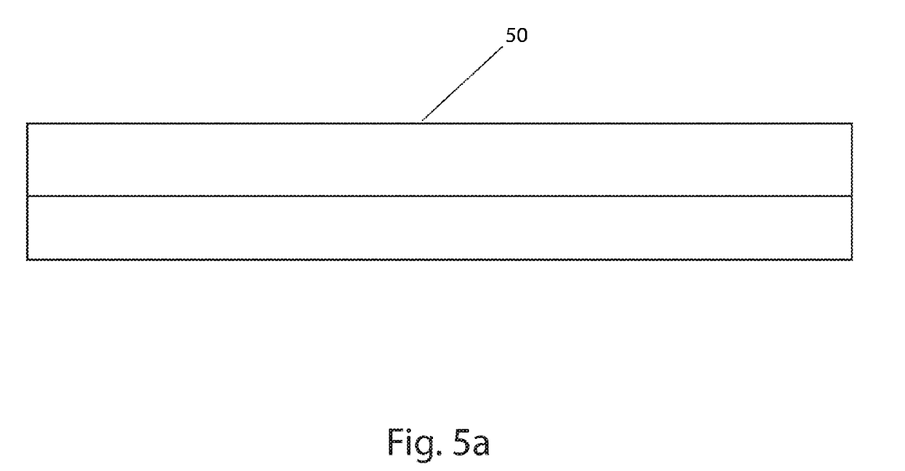
FIG. 5a is a front view of the mounting bracket 50 according to the preferred embodiment of the present invention.
Figure 5B:
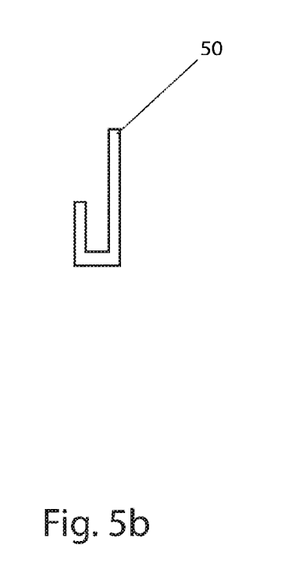
FIG. 5b is a side view of the mounting bracket 50 according to the preferred embodiment of the present invention; and, FIG. 6 is a perspective view illustrating the food dispensing caddy 10 fabricated within a refrigerator 150.
Figure 6:
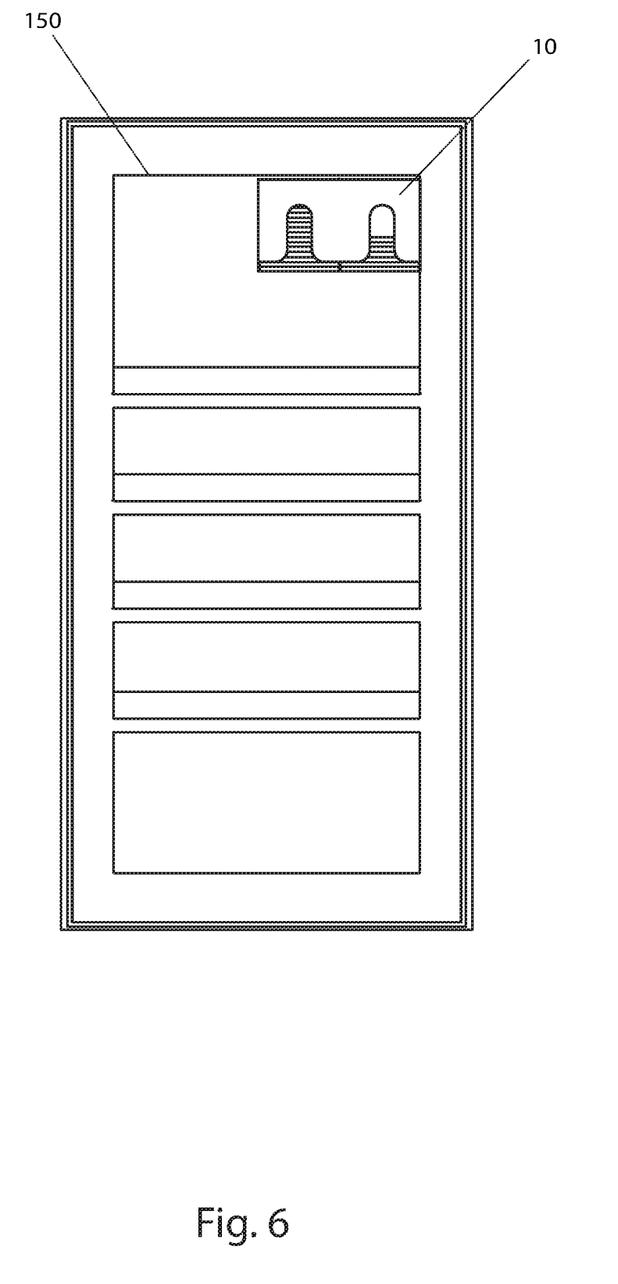

The best mode for carrying out the invention is presented in terms of its preferred embodiment, herein depicted within FIGS. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention is directed to a dispensing receptacle 10 whereby foodstuff 100, particularly individually wrapped slices of cheese, may be dispensed singularly without the need for removal of an entire package of cheese, thus saving time. A food dispensing caddy 10 may can be easily stored in a refrigerator 150, on a shelf, or incorporated into the refrigerator 150. The caddy 10 may also deter spoilage by reducing unnecessary handling of any uneaten cheese 100.

Referring now to the drawings, there is shown in FIGS. 1-6 various views of a food dispensing caddy 10. In one (1) embodiment of the invention, the caddy 10 may comprise a pair of receptacle compartments 15a, 15b. Each receptacle compartment 15a, 15b may further comprise an open top portion, which in at least one (1) embodiment, is covered with a respective lid 16a, 16b. The open top provides interior access to the respective compartment 15a, 15b, useful for initial filling with foodstuffs, such as individually wrapped cheese slices 100 as well as periodic refilling. Each compartment 15a, 15b may be useful for storing multiple slices of cheese 100 in vertical stacks. It is envisioned that said compartments 15a, and 15b each can hold an entire package of individually wrapped cheese 100 slices as well as an additional amount of approximately twenty percent (20%) to allow for refilling before empty. The lids 16a, 16b may be removed for allowing the filling and refilling of different types of square-sliced, rectangular-sliced, or even round-sliced pieces of cheese 100. The lids 16a, 16b could be sized to be merely placed in or on the opening of the respective compartment 15a, 15b to fully cover it, or affixed to either the front wall 20 or rear wall 25 in a hinged means to enable the respective lid 16a, 16b to be opened. Alternately, other types of foodstuffs 100 can be stored therein for subsequent dispensing.

A first side panel 21 and second side panel 22 are each attached at opposing edges to a front panel 20 and a rear panel 25 and span a distance therebetween. A bottom panel 24 spans a distance between inner surfaces of each of the front panel 20, rear panel 25, first side panel 21 and second side panel 22 to create a generally five-sided structure. The bottommost edges of both the first side panel 21 and second side panel 22 are coterminous and extend downward from the bottom panel 24, front panel 20, and rear panel 25 to act as feet to support the caddy. A divider panel 27, affixed at opposing side edges to the front panel 20 and rear panel 25, and at a bottom edge to the bottom panel 24, separates the interior into the aforementioned receptacle compartments 15a, 15b. In at least one (1) embodiment, the divider panel 27 creates the receptacle compartments 15a, 15b having identical or nearly identical volumetric capacities. A centrally-located foot 23 affixed to the bottom panel 24 and a stiffener rib 18 affixed to the bottom panel 24 and spanning between the first and second side panels 21, 22 each aid in supporting the caddy 10 and providing resiliency thereto. The bottommost edges of the first side panel 21 and second side panel 22 are coterminous with the bottommost edge of the foot 23. In certain embodiments, the foot 23 is an extension of the divider panel 27.

In continuing to refer to the drawings, a bottom of each of the vertical receptacle compartments 15a, 15b may comprise an opening 30a, 30b. Both the first and second openings 30a, 30b have a coextensive bottom portion that spans the distance directly underneath the front panel 20. The first opening 30a has a first view slot 31a centrally located and extending upward therefrom, terminating in a half-moon profile. The second opening 30b has a similarly disposed second view slot 31b. The first opening 30a provides a dispensing area for contents 100 stored within the first compartment 15a and the first view slot 31a enables one to view the amount of contents 100 therein. Similarly, the second opening 30b provides a dispensing area for contents 100 stored within the second compartment 15b and the second view slot 31b enables one to view the amount of contents 100 therein. provides access while providing open access to the bottom slice of cheese 100 within the stack. Each view slot 31a, 31b is structured and arranged to be accessible by fingertips of the user, thereby permitting the user to pull out the bottom slice of cheese 100 from the desired compartment 15a, 15b. As such, no other cheese slices 100 are touched, thereby reducing food contamination and the unnecessary spreading of bacteria. Additionally, said arrangement provides for a "first in, first out" usage process ensuring that the oldest piece of cheese 100 is consumed first.

In one (1) embodiment, the opening 30a, 30b may comprise dimensions of approximately one-quarter inch (¼ in.) height and three-and-a-half inches (3½ in.) width. Other dimensions may be appropriate for thinner or thicker sliced cheese 100 and may vary based on consumer preference.

In one (1) embodiment of the present invention, each opening 30a, 30b exposes the front edge of the bottom panel 24 of each compartment 15a, 15b. The exposed edges of the bottom panel 24 may be useful for retaining the bottom slice 100 of cheese of the vertical stack of cheese 100 for easy accessibility by the user. Gravity from the weight of the slices 100 above may be sufficient to sustain a fixed position of the bottom slice of cheese 100 against the exposed edge of the bottom panel 24 of each compartment 15a, 15b through the opening 30a, 30b for simple removal by the user without touching other cheese slices 100. The bottom panel 24 is preferably sloped to offset the cheese stack 100. In such a manner, the stacks of cheese 100 may rest at an angle. This may further improve accessibility of the cheese 100. Also, the front panel 20 can have a bulbous bottom portion extending away from the compartments 15a, 15b, thereby enabling the bottommost cheese slices 100 to not be bunched up against the inner surface of the front panel 20 due to the sloped nature of the bottom panel 20 forcing the bottommost cheese slices 100 within the compartments 15a, 15b to be biased towards the respective opening 30a, 30b. Also, the bulbous bottom of the front panel 20 creates a smooth contact for a user's finger or fingers or hand that slides down the desired view slot 31a, 31b to manually dispense the cheese slice 100 from the desired opening 30a, 30b from the desired compartment 15a, 15b.

In a preferred embodiment, the front panel 20, rear panel 25, side panels 21, 22, divider panel 27, foot 23, and stiffener rib 18 is fabricated as a unitary construction, where the leading front top edge of the front panel 20 is rounded rearwardly, the front bottom leading edges of the side panels 21, 22, and foot 23 are also rounded rearwardly. These rounded edges resist any snagging or catching of hard edges of the caddy 10 on ancillary items, such as clothes, skin, or food packaging. Components of the caddy 10 may be manufactured of plastic. In such a manner, the receptacle compartments 15a, 15b and top cover lids 16a, 16b may be hand and machine washed. In other embodiments, components of the caddy 10 may comprise metal and other ferrous materials, wood, ceramic, and the like.

The caddy 10 advantageously dispenses cheese 100 which may be conveniently mounted to a refrigerator door 150. In such a manner, a user may access cheeses 100 of different types just as easily as the user may access eggs, butter, or vegetables, each typically having their own compartment. In one (1) method of mounting the caddy 10, at least one (1) adhesive may be provided enabling a rear portion of the cheese dispenser to be adhesively-mounted to an inside wall of the refrigerator 150. Other mounting methods may include, but are not limited to, an appendage 51 on the rear panel 25 of the caddy 10 capable of being secured to a mounting bracket 50, fasteners, screws, magnets, clips, hanging nail, and the like. In such an embodiment, the appendage 51 is coextensive with a width of the rear panel 25, and disposed adjacent the top thereof. The appendage 51 is capable of receiving or otherwise supporting the mounting bracket 50. In a preferred embodiment, the appendage 51 has a cross-section generally of an inverted "L"-shape, capable of receiving the mounting bracket 50, which has a cross-section generally having a "J"-shape. The use of any particular type of mounting arrangement is not intended to be a limiting factor of the present invention.

It should be appreciated that design and appearance of the caddy 10 may vary based on user preference. In one (1) embodiment, the caddy 10 may comprise a polished finish.

The exact specifications, materials used, and method of use of the caddy 10 may vary upon manufacturing.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A dispenser, comprising:
   a first side panel;
   a second side panel;
   a rear panel spanning a distance between rearmost edges of both said first and second side panels;
   a front panel affixed to and spanning a distance between frontmost edges of both said first and second side panels;
   a bottom panel affixed to an inner surface of said rear panel and affixed to and spanning a distance between interior surfaces of both said first and second side panels, said bottom panel sloping from said rear panel towards said front panel;
   a divider panel affixed to opposing inner surfaces of said front panel and said rear panel, having a bottom edge affixed to said bottom panel, said divider panel bisecting an interior into a first compartment and a second compartment;
   a first opening located at a bottom of said front panel, providing access to said first compartment;
   a first view slot extending upward from said first opening;
   a second opening located at a bottom of said front panel, providing access to said second compartment;
   a second view slot extending upward from said second opening; and,
   a foot having an upper edge affixed to and extending downward from said bottom panel;
   wherein said first and second compartments are each capable of retaining a stack of items therein;
   wherein said first opening enables dispensation of at least one of said items from said first compartment; and,
   wherein said second opening enables dispensation of at least one of said items from said second compartment.

2. The dispenser of claim 1, wherein a bottom portion of said first side panel and a bottom portion of said second side panel each extend downward from said bottom panel such that a bottommost surface of each said first and second side panels are coterminous with a bottommost surface of said foot.

3. The dispenser of claim 1, wherein said rear panel further comprises an appendage extending away from a bottommost end and coextensive with a width thereof.

4. The dispenser of claim 1, further comprising a stiffener rib affixed to a bottom surface of said bottom panel, perpendicular to said foot, and coextensive with a width thereof.

5. The dispenser of claim 1, further comprising:
   a first lid having a first side attached to said rear wall, capable of removably covering said first compartment; and,
   a second lid having a first side attached to said rear wall, capable of removably covering said second compartment.

6. The dispenser of claim 1, wherein said first and second opening each further comprise a continuous bottom portion, coextensive with a width of said front panel.

7. The dispenser of claim 6, wherein:
   said first view slot has a first bottom portion extending upward from said continuous bottom portion and terminating in a first half-moon profile; and;
   said second view slot has a second bottom portion extending upward from said continuous bottom portion and terminating in a second half-moon profile;
   wherein said first view slot is at a center location of said first compartment; and, wherein said second view slot is at a center location of said second compartment.

8. The dispenser of claim 1, wherein a bottom portion of said front panel comprises a forwardly extending bulbous shape.

9. A dispenser, comprising:
a dispenser body, comprising:
a first side panel;
a second side panel;
a rear panel spanning a distance between rearmost edges of both said first and second side panels;
an appendage affixed to an outer surface of said rear panel;
a front panel affixed to and spanning a distance between frontmost edges of both said first and second side panels;
a bottom panel affixed to an inner surface of said rear panel and affixed to and spanning a distance between interior surfaces of both said first and second side panels, said bottom panel sloping from said rear panel towards said front panel;
a divider panel affixed to opposing inner surfaces of said front panel and said rear panel, having a bottom edge affixed to said bottom panel, said divider panel bisecting an interior into a first compartment and a second compartment;
a first opening located at a bottom of said front panel, providing access to said first compartment;
a first view slot extending upward from said first opening;
a second opening located at a bottom of said front panel, providing access to said second compartment;
a second view slot extending upward from said second opening; and,
a foot having an upper edge affixed to and extending downward from said bottom panel; and,
a mounting bracket removably couplable with said appendage;
wherein said first and second compartments are each capable of retaining a stack of items therein;
wherein said first opening enables dispensation of at least one of said items from said first compartment;
wherein said second opening enables dispensation of at least one of said items from said second compartment; and,
wherein said mounting bracket is adapted to be removably mounted to a support structure.

10. The dispenser of claim 9, wherein a bottom portion of said first side panel and a bottom portion of said second side panel each extend downward from said bottom panel such that a bottommost surface of each said first and second side panels are coterminous with a bottommost surface of said foot.

11. The dispenser of claim 9, wherein said rear panel further comprises an appendage extending away from a bottommost end and coextensive with a width thereof.

12. The dispenser of claim 9, further comprising a stiffener rib affixed to a bottom surface of said bottom panel, perpendicular to said foot, and coextensive with a width thereof.

13. The dispenser of claim 9, further comprising:
a first lid having a first side attached to said rear wall, capable of removably covering said first compartment; and,
a second lid having a first side attached to said rear wall, capable of removably covering said second compartment.

14. The dispenser of claim 9, wherein said first and second opening each further comprise a continuous bottom portion, coextensive with a width of said front panel.

15. The dispenser of claim 14, wherein:
said first view slot has a first bottom portion extending upward from said continuous bottom portion and terminating in a first half-moon profile; and;
said second view slot has a second bottom portion extending upward from said continuous bottom portion and terminating in a second half-moon profile;
wherein said first view slot is at a center location of said first compartment; and,
wherein said second view slot is at a center location of said second compartment.

16. The dispenser of claim 9, wherein a bottom portion of said front panel comprises a forwardly extending bulbous shape.

17. The dispenser of claim 9, wherein said mounting bracket has a width coextensive with a width of said appendage.

18. The dispenser of claim 9, wherein said appendage has a width coextensive with a width of said rear panel.

19. The dispenser of claim 18, wherein said mounting bracket has a width coextensive with a width of said appendage.

* * * * *